No. 696,681. Patented Apr. 1, 1902.
J. D. INGRAM.
DRAFT EQUALIZER.
(Application filed Oct. 12, 1901.)
(No Model.)
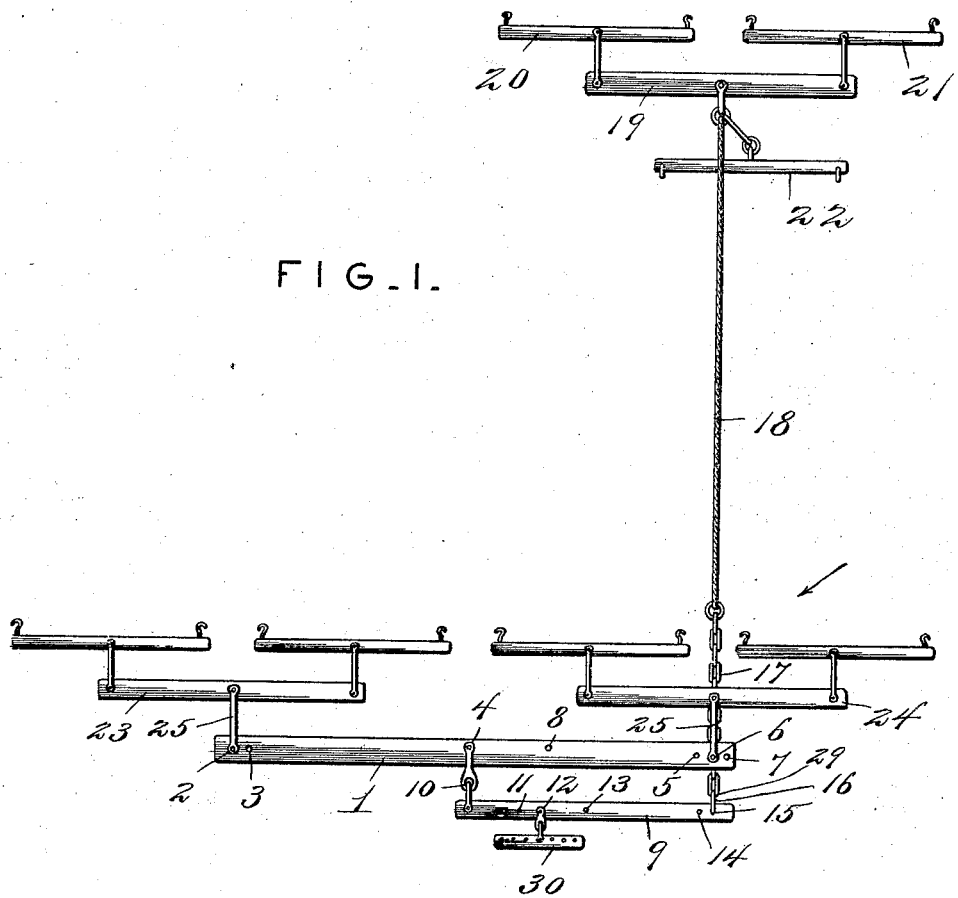
FIG. 1.
FIG. 2.
Witnesses
H. L. Amer.
W. Arthur Maddox,
Inventor
Joseph D. Ingram.
By Victor J. Evans
Attorney
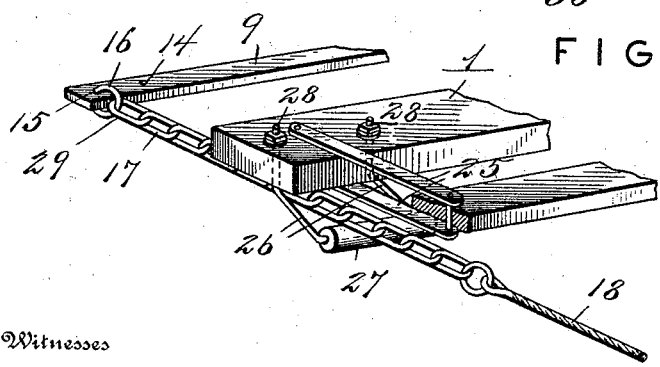
THE NORRIS PETERS CO., PHOTO-LITHO., WASHINGTON, D. C.

UNITED STATES PATENT OFFICE.

JOSEPH D. INGRAM, OF BENVANUE, TEXAS.

DRAFT-EQUALIZER.

SPECIFICATION forming part of Letters Patent No. 696,681, dated April 1, 1902.

Application filed October 12, 1901. Serial No. 78,474. (No model.)

*To all whom it may concern:*

Be it known that I, JOSEPH D. INGRAM, a citizen of the United States, residing at Benvanue, in the county of Clay and State of Texas, have invented new and useful Improvements in Draft-Equalizers, of which the following is a specification.

My invention relates to draft-equalizers adapted especially for use with gang-plows and other agricultural machines.

The object of the invention is to provide an equalizer of simple, durable, and inexpensive construction, adapted for hitching from one to six horses, which will effectually prevent side draft and insure an equalization of the draft among the horses.

The invention consists in the combination, with a plurality of single and double trees, of an evener-bar, a chain or cable connected to one end of said bar, and a draft-loop arranged in advance of the evener-bar and carrying a roller over which the chain or cable passes. The construction of the improvement will be fully described hereinafter in connection with the accompanying drawings, which form a part of this specification.

In the drawings, Figure 1 is a top plan view of a draft-equalizer embodying the invention, and Fig. 2 is a perspective view, on an enlarged scale, of a portion of the same looking in the direction of the arrow in Fig. 1.

The reference-numeral 1 designates a doubletree formed near its left-hand end with openings 2 and 3, a central opening at 4, openings 5, 6, and 7 at its right-hand end, and an opening 8 adjacent to the central opening 4.

9 designates an evener-bar connected at its left-hand end by a clevis 10 to the center of the doubletree 1 and formed with openings 11, 12, 13, 14, and 15. Within the opening 15 is secured a ring 16, by means of which the evener-bar is connected to a chain 17, passing under the end of the doubletree 1 and attached by means of a cable 18 to a doubletree 19, to the ends of which are secured in the usual manner singletrees 20 and 21, a third singletree 22 being also attached to the doubletree 19.

23 and 24 designate doubletrees secured by draft-links 25.

The chain 17 passes through a loop comprising parallel arms 26, having their lower ends bent forward and connected by a crossbar, on which is loosely mounted a roller 27, upon which the chain bears. The upper ends of the loop-arms 26 extend through the openings 5 and 7 in the end of the doubletree 1 and are threaded to receive securing-nuts 28.

The device as thus described and as shown in Fig. 1 is adapted for six horses and will insure an even distribution or equalization of the draft.

To adapt the device for five horses, remove the doubletree 23, substituting a singletree therefor at 25. Shift the clevis 10 to the holes 8 and 12 and the clevis 29, connecting the doubletree 1 and bar 9, to the holes 5 and 14, and the clevis 30, attached to the evener-bar, to the holes 13. For four horses only the doubletrees 1 and the trees 23 and 24, with their attached singletrees, are employed, the evener-bar 9 and its contents being removed, leaving the simple four-horse doubletree. For three horses the parts are arranged the same as for five except that the evener-bar and its attachments are removed, and for two horses any one of the doubletrees 19, 23, or 24 may be utilized.

The guide-loop through which the chain 17 passes is so constructed as to support the roller 27 in position to avoid undue friction on the chain and to guide the chain when draft-strain is applied thereto.

I claim—

1. A draft-equalizer comprising a main doubletree formed with a plurality of openings, supplemental doubletrees adjustably connected to the main tree, an evener-bar also formed with a plurality of holes to adapt the draft connections between said bar and the main doubletree to be adjusted, a chain or cable attached to one end of the evener-bar, a doubletree attached to the forward end of said chain, and a loop supported in front of the evener-bar and carrying a roller.

2. In a draft-equalizer, the combination with a plurality of doubletrees, and an evener-bar attached to the main doubletree, of a draft-chain attached to said evener-bar, and a loop comprising parallel arms depending from said main doubletree and bent forward and connected by a cross-bar, and a roller loosely mounted on said cross-bar over which the chain passes.

In testimony whereof I affix my signature in presence of two witnesses.

JOSEPH D. INGRAM.

Witnesses:
R. E. TAYLOR,
L. D. POWELL.